(12) United States Patent
Page et al.

(10) Patent No.: US 10,871,873 B2
(45) Date of Patent: Dec. 22, 2020

(54) REDIRECTION OF WEB CONTENT

(71) Applicant: Citrix Systems, Inc., Fort Lauderdale, FL (US)

(72) Inventors: James Michael Page, Coral Springs, FL (US); Hariprasad Chowlur, Parkland, FL (US); Todd Giebler, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/751,493

(22) Filed: Jan. 24, 2020

(65) Prior Publication Data

US 2020/0167043 A1 May 28, 2020

Related U.S. Application Data

(63) Continuation of application No. 15/700,587, filed on Sep. 11, 2017, now Pat. No. 10,545,625.

(51) Int. Cl.

| G06F 3/0481 | (2013.01) |
| G06T 11/60 | (2006.01) |
| H04L 29/06 | (2006.01) |
| H04L 29/08 | (2006.01) |

(52) U.S. Cl.
CPC ............ *G06F 3/0481* (2013.01); *G06T 11/60* (2013.01); *H04L 67/38* (2013.01); *H04L 67/02* (2013.01); *H04L 67/28* (2013.01); *H04L 67/2814* (2013.01)

(58) Field of Classification Search
CPC .................................................... G06F 3/0481
USPC ........................................................ 715/740
See application file for complete search history.

(56) References Cited

U.S. PATENT DOCUMENTS

| 9,191,425 | B2 | 11/2015 | Momchilov et al. |
| 9,710,441 | B2 | 7/2017 | Gondo et al. |
| 10,205,678 | B2 | 2/2019 | Dimitropoulos |
| 10,545,625 | B2 * | 1/2020 | Page ...................... G06T 11/60 |
| 2010/0106798 | A1 | 4/2010 | Barreto et al. |

(Continued)

OTHER PUBLICATIONS

Lantinga, Hilko, "What's New in VMware Horizon 7.2 & Horizon Client 4.5," VM End-User Computing Blog, retrieved 'Sep. 11, 2017, from https://blogs.vmwar.com/euc/2017/07/vmware-horizon-7.2-client-4-5_whats_new.html, 20 pages.

(Continued)

*Primary Examiner* — William D Titcomb
(74) *Attorney, Agent, or Firm* — Banner & Witcoff, Ltd.

(57) ABSTRACT

Aspects described herein are directed to the redirection of web content from a virtual desktop session on a remote computing device to a client computing device for rendering. A virtual delivery agent on the remote computing device may remote a web browser instance to a receiver on a client computing device. The virtual delivery agent may receive, from the remoted browser instance on client computing device, a uniform resource locator (URL). Based on the URL, the virtual delivery agent on the remote computing device may terminate loading of page content associated with the URL on the remote computing device. The virtual delivery agent may instruct the client computing device to render the page content in an overlaid position corresponding to the remoted web browser instance on the receiver of the client computing device.

20 Claims, 16 Drawing Sheets

(56) References Cited

U.S. PATENT DOCUMENTS

| | | |
|---|---|---|
| 2010/0269152 A1 | 10/2010 | Pahlavan et al. |
| 2012/0266068 A1 | 10/2012 | Ryman et al. |
| 2012/0324365 A1 | 12/2012 | Momchilov et al. |
| 2014/0006979 A1 | 1/2014 | Venkatesh et al. |
| 2014/0344332 A1 | 11/2014 | Giebler |
| 2019/0121442 A1 | 4/2019 | Cao et al. |
| 2019/0132381 A1 | 5/2019 | Momchilov et al. |
| 2020/0050467 A1* | 2/2020 | Dobson ................ G06F 3/1454 |
| 2020/0097614 A1* | 3/2020 | Borkar ................ G06F 16/904 |
| 2020/0167043 A1* | 5/2020 | Page ................ G06F 3/0481 |

OTHER PUBLICATIONS

May 9, 2019—U.S. Non-final Office Action—U.S. Appl. No. 15/700,587.
Sep. 18, 2019—U.S. Notice of Allowance—U.S. Appl. No. 15/700,587.

* cited by examiner

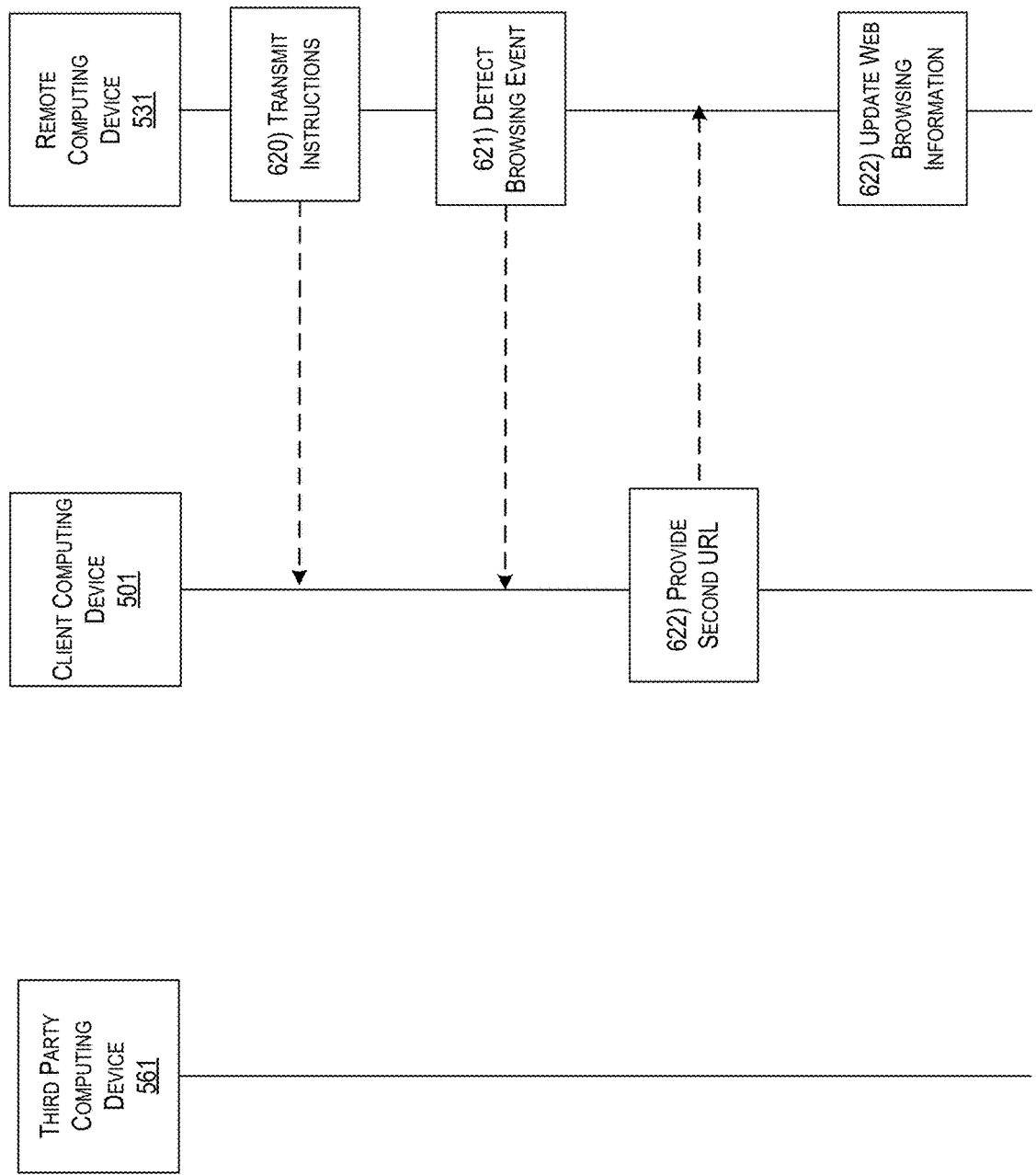

REDIRECTION OF WEB CONTENT

CROSS-REFERENCE TO RELATED APPLICATIONS

This application is a continuation of and claims priority to co-pending U.S. Non-Provisional patent application Ser. No. 15/700,587, filed Sep. 11, 2017, entitled "REDIRECTION OF WEB CONTENT," the contents of which are hereby incorporated by reference in its entirety, for all purposes.

FIELD

Aspects described herein generally relate to desktop virtualization. In particular, one or more aspects of the disclosure relate to the redirection of web content from a virtual desktop to a client computing device.

BACKGROUND

Virtual computing provides many benefits, in part, through the leveraging of processing capacity of server computing systems. However, some tasks performed in virtual computing arrangements are inefficient and lead to the overconsumption of network and processing bandwidth. For example, rendering and redirecting content of a webpage from a server computing device hosting a virtual computing session to a client computing device engaged with the server computing device in the virtual computing session may be a network and processing intensive task.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards to the redirection of web content from a virtual desktop to a client computing device.

In accordance with one or more embodiments, a virtual delivery agent on a remote computing device may remote a web browser instance to a receiver on a client computing device, which may be connected through a virtual channel with the remote computing device. The virtual delivery agent at the remote computing device may receive, from the remoted browser instance on client computing device, a uniform resource locator (URL). Based on the URL, the virtual delivery agent on the remote computing device may terminate loading of page content associated with the URL on the remote computing device. The virtual delivery agent on the remote computing device may instruct the client computing device to render the page content in an overlaid position corresponding to the remoted web browser instance on the receiver of the client computing device.

In some embodiments, the remote computing device may generate a window frame of the remoted web browser instance. The virtual delivery agent on the remote computing device may redirect locational and clipping information for the window frame of the remoted web browser to the client computing device. The instructing the client computing device to render the page content in an overlaid position corresponding to the remoted web browser instance on the receiver may be further based off of the redirected locational and clipping information for the window frame of the remoted web browser.

In some embodiments, the virtual delivery agent on the remote computing device may insert a functional script into the page content associated with the URL. Based on the URL, the virtual delivery agent on the remote computing device may activate the functional script to prevent the page content from loading on the remote computing device.

In some embodiments, the virtual delivery agent on the remote computing device may monitor a position of a window frame of the remoted web browser on the receiver of the client computing device. The virtual delivery agent on the remote computing device may detect a movement of the position of the window frame of the remoted web browser on the receiver of the client computing device. Based on the movement of the position of the window frame, the virtual delivery agent on the remote computing device may instruct the client computing device to render the page content in an overlaid position corresponding to the remoted web browser instance on the receiver.

In some embodiments, the remote computing device may retrieve page content from a third party computing device associated with the URL. The remote computing device may identify one or more dynamic elements of the page content associated with the URL. Based on the one or more dynamic elements of the page content associated with the URL, the virtual delivery agent of the remote computing device may terminate loading of the page content associated with the URL on the remote computing device.

In some embodiments, the virtual delivery agent on the remote computing device may receive, from the remoted browser instance on the client computing device, a URL to which the client computing device does not have access. The virtual delivery agent on the remote computing device may instantiate a virtual proxy server and instruct the receiver on the client computing device to connect to the instantiated virtual proxy server.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6G depict an illustrative event sequence for redirecting web content from a virtual desktop to a client computing device in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards redirecting web content rendering to a client computing device connected through a virtual channel with a remote computing device. A virtual delivery agent on the remote computing device may remote a web browser instance to a receiver on the client computing device through the virtual channel A user of the client computing device may provide a uniform resource locator (URL) to the remoted web browser instance on the client computing device, which may then be transmitted by the receiver through the virtual channel to the virtual delivery agent on the remote computing device. Upon receipt, the virtual delivery agent may analyze one or more of the URL and page content associated with the URL to identify whether the content should be rendered at the remote computing device or the client computing device. In the event that the virtual delivery agent determines that the content should be rendered at the client computing device, the virtual delivery agent may terminate loading of the page content associated with the URL on the remote computing device and may instruct the client computing device to render the page content in an overlaid position corresponding to the remoted web browser instance on the receiver. Through doing so, network and processing efficiency may be increased by allocating content rendering responsibilities to the client computing device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
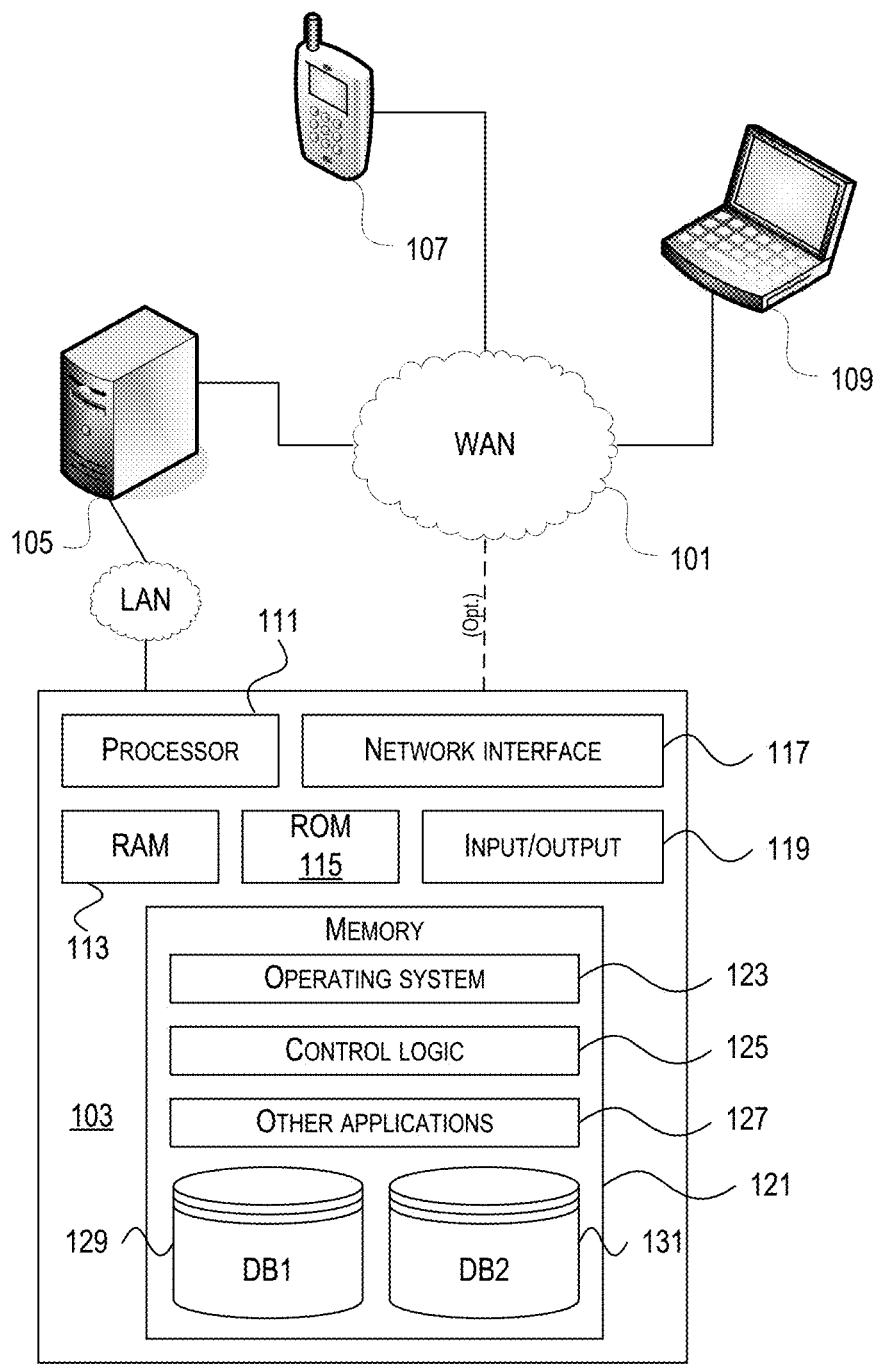
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
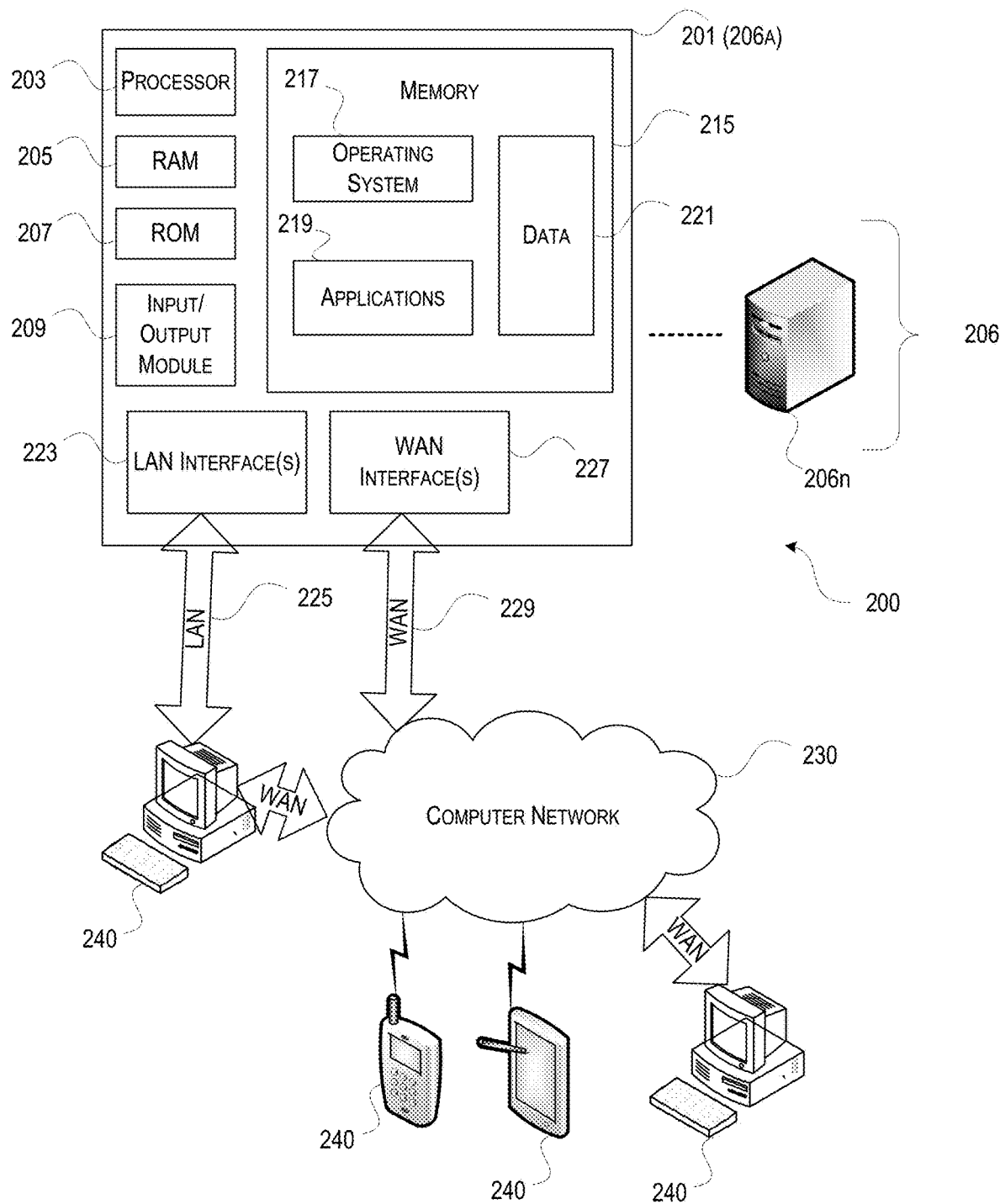
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
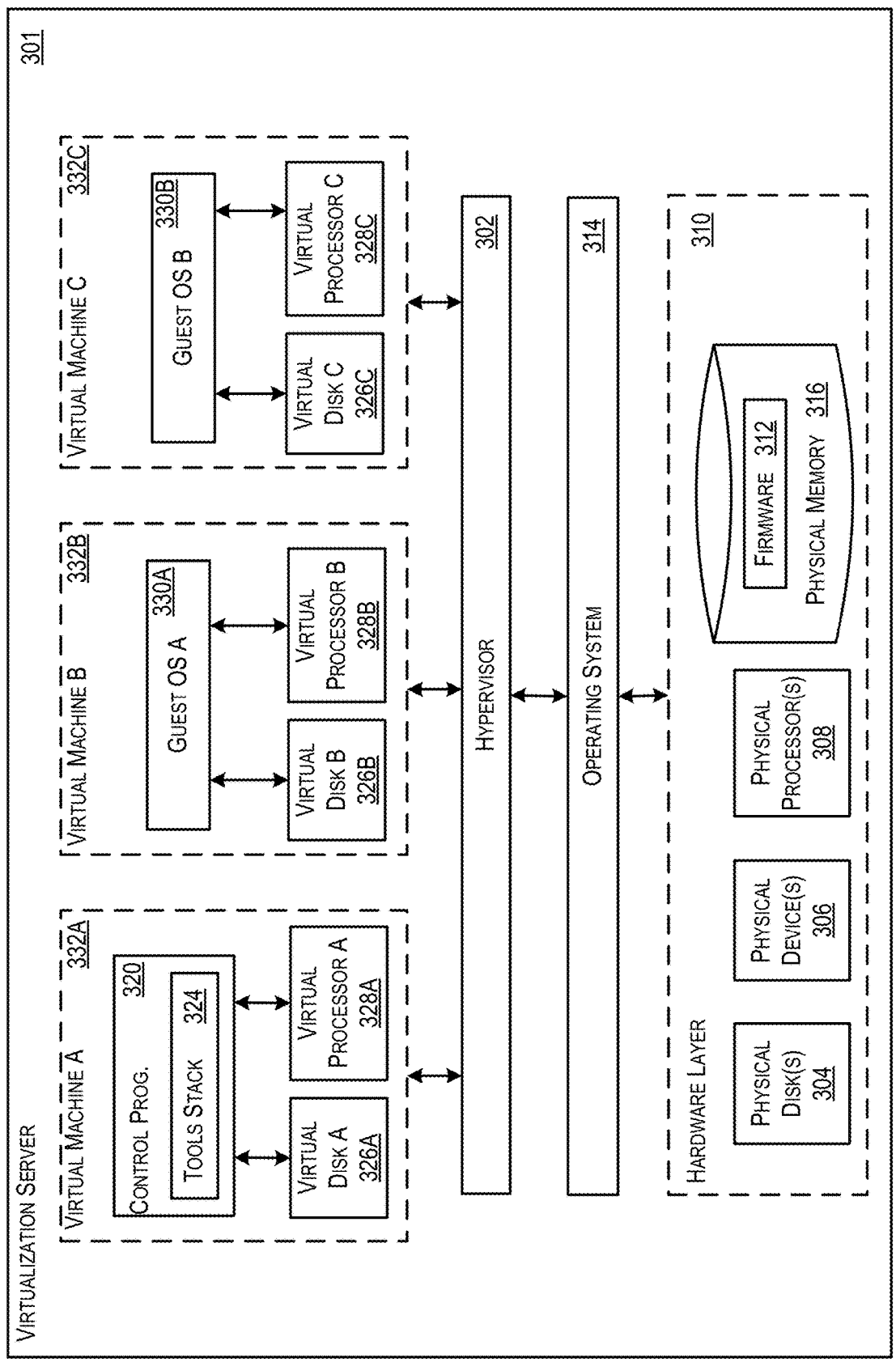
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, DomO, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
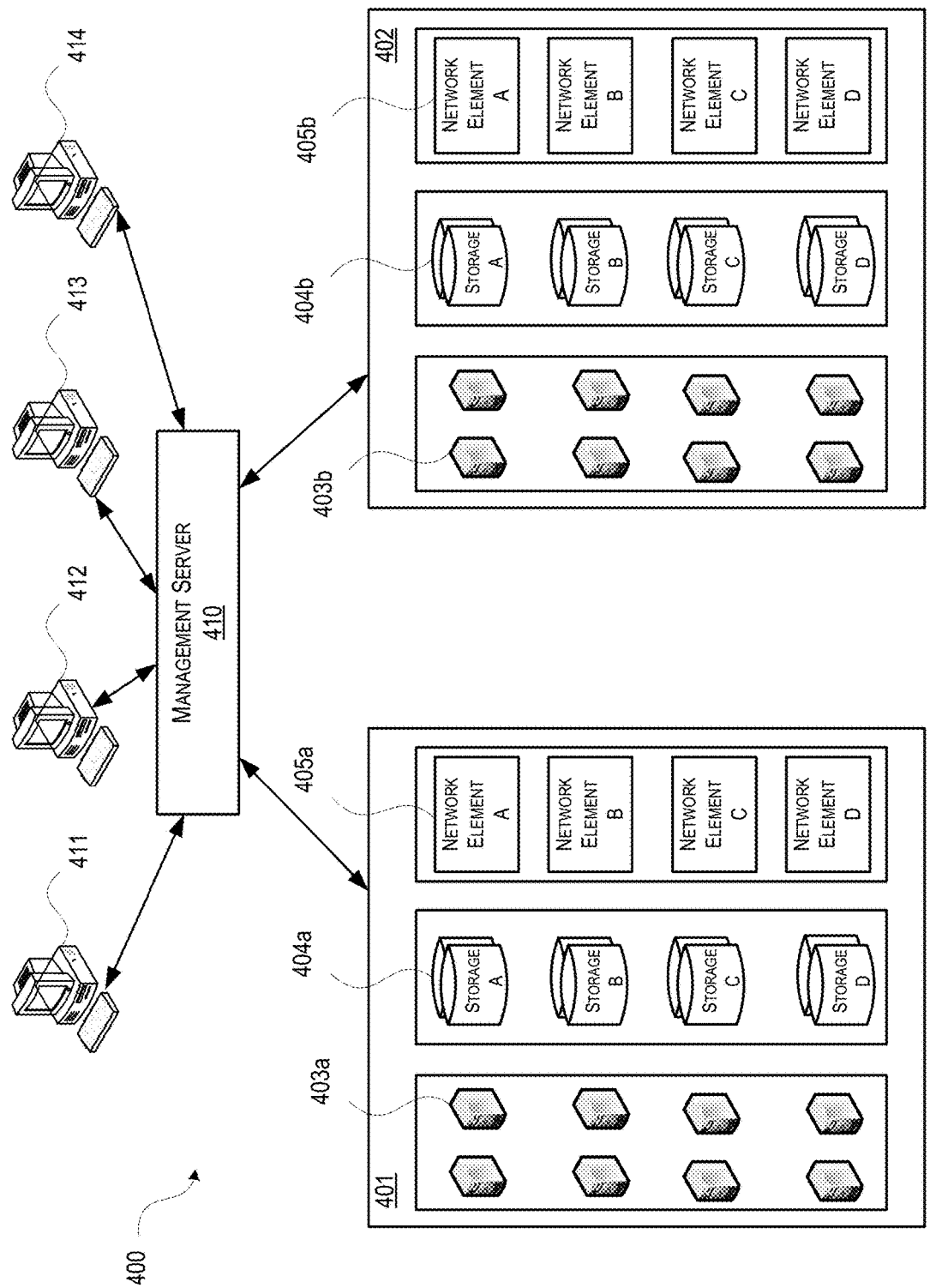
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, New York), or others.

Redirection of Web Content

Figure 5:
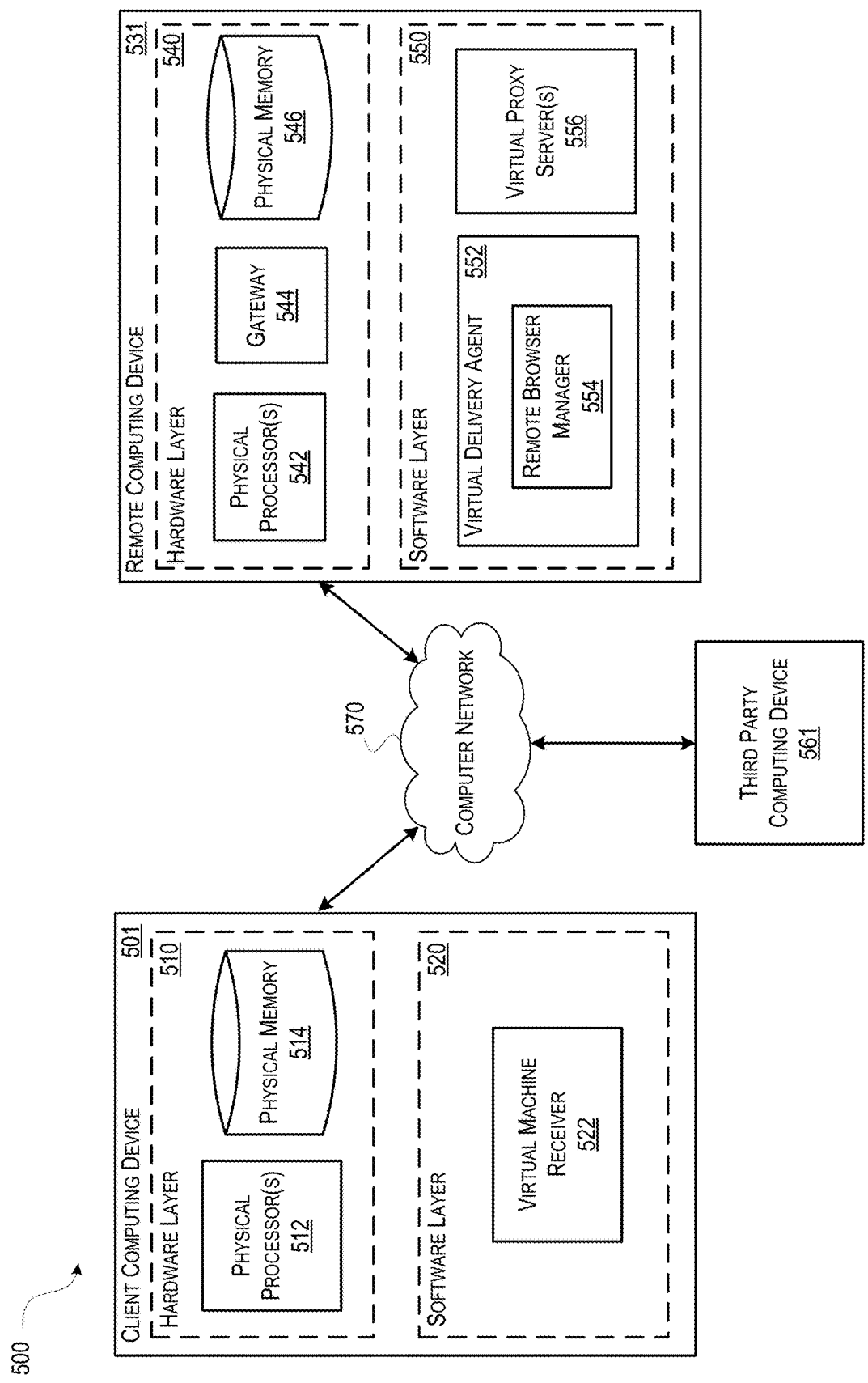
FIG. 5 depicts an illustrative diagram of a system for redirecting web content from a virtual desktop to a client computing device in accordance with one or more illustrative aspects described herein.

FIG. 5 depicts an illustrative diagram of a computing system 500 for performing redirection of web content from a virtual desktop to a client computing device in accordance with one or more illustrative aspects of the disclosure. As shown in FIG. 5, computing system 500 may include at least client computing device 501, remote computing device 531, and third party computing device 561, which may be configured to communicate with each other through computer network 570. In some instances, additional computing devices similar to client computing device 501, remote computing device 531, and/or third party computing device 561 may be included in computing system 500. According to the embodiment depicted in FIG. 5, one or more of the client computing device 501, remote computing device 531, and third party computing device 561 may participate in performing redirection of web content in accordance with one or more illustrative aspects of the disclosure as will be described in further detail below.

Client computing device 501 may be any one of a personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, and may include any of the above systems or devices described in FIGS. 1-4. As shown in FIG. 5, client computing device 501 may include a hardware layer 510 and a software layer 520. In some embodiments, hardware layer 510 may include at least physical processor(s) 512 and physical memory 514, but may also include, and/or be communicatively coupled to, other hardware components such as communication interfaces and/or input/output devices (e.g., keyboard, mouse, monitor, and the like). Each of the physical processor(s) 512 may be of a similar type, or of a different type. For instance, physical processor(s) 512 may be any of at least graphical processing units (GPUs) and/or central processing units (CPUs). Physical memory 514 in the hardware layer 510 may include any type of memory designed for long term and/or short term information storage. Physical memory 514 of client computing device 501 may include an operating system and/or firmware that may be executed by physical processor(s) 512. Further, physical memory 514 may store data and, in some embodiments, one or more programs and/or sets of executable instructions, which may be configured to be executed by physical processor(s) 512. Such programs and/or sets of executable instructions, when executed by physical processor(s) 512, may cause client computing device 501 to perform one or more of the operations in the redirecting of web content described herein.

In some instances, physical memory 514 may further store one or more aspects of software layer 520. For example, physical memory 514 may include memory elements corresponding to virtual machine receiver 522, which may be an executable application and/or software package that performs one or more of the processes described herein. In particular, virtual machine receiver 522 may be configured to create a communicative portal and/or channel, by way of computer network 570, through which a user of client computing device 501 can interact with one or more virtual machines operating on remote computing device 531. In some arrangements, virtual machine receiver 522 may be a web browser which may enable a user of client computing device 501 to connect to a web interface corresponding to one or more virtual machines operating on remote computing device 531.

Virtual machine receiver 522 may connect to virtual delivery agent 552 of remote computing device 531 by way of a virtual channel on computer network 570. Through virtual machine receiver 522, a user of client computing device 501 may be able to communicate with one or more virtual machines on remote computing device. In some instances, which will be described in further detail below, virtual delivery agent 552 of remote computing device 531 may transmit instructions to client computing device 501 by way of virtual machine receiver 522.

Remote computing device 531 may be configured as a virtualization server in a virtualization environment, for example, in a single-server, multi-server, or cloud computing environment. As such, remote computing device 531 as illustrated in FIG. 5 may be deployed as any of the above systems or devices described in FIGS. 1-4 to provide virtual desktops and/or virtual applications to one or more endpoint devices such as client computing device 501.

Included in remote computing device 531 may be hardware layer 540 and software layer 550. Hardware layer 540 of remote computing device 531 may include at least physical processor(s) 542, gateway 544, and/or physical memory 546, but also may include one or more additional hardware elements such as communication interfaces. Physical processor(s) 542 may be any of a plurality of types including at least graphical processing units (GPUs) and/or central processing units (CPUs). Gateway 544 may serve as a network node configured to interface with computer network 570 and provide system interoperability for remote computing device 531. Physical memory 546 in the hardware layer 540 may include any type of memory designed for long term and/or short term information storage. Physical memory 546 of remote computing device 531 may include an operating system and/or firmware that may be executed by physical processor(s) 542. Further, physical memory 546 may store data and, in some embodiments, one or more programs and/or sets of executable instructions, which may be configured to be executed by physical processor(s) 542. Such programs and/or sets of executable instructions, when executed by physical processor(s) 542, may cause remote computing device 531 to perform one or more of the operations in virtual machine instantiation and management as described above, and in the redirecting of web content described in further detail below. In some instances, physical memory 546 may further store one or more aspects of software layer 550. For example, physical memory 546 may include memory elements corresponding to virtual machine agent 552, remote browser manager 554, and virtual proxy server(s) 556, which may be an executable application and/or software package that performs one or more of the processes described herein.

As stated above, virtual delivery agent 552 may be configured to interface with virtual machine receiver 522 of client computing device 501 in order to provide one or more virtual computing sessions to a user of client computing device 501. In such virtual computing sessions, virtual delivery agent 552 may utilize remote browser manager 554 to facilitate web browsing in the virtual computing arrangement with client computing device 501. For instance, remote browser manager 554 may be used by virtual delivery agent 552 to receive web browsing information from client computing device 501 and transmit instructions to client computing device 501 by way of virtual machine receiver 522 based on web browsing events. Such instructions may cause client computing device 501 to render page content associated with a URL.

For example, web browsing performed during the virtual machine session by a user of client computing device 501 may involve accessing one or more URLs associated with third party computing device 561, which may be any of a personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, and may include any of the above systems or devices described in FIGS. 1-4. Based on a URL associated with third party computing device 561 and/or page content corresponding to the URL, virtual delivery agent 552 of remote computing device 531 may terminate loading of page content of the URL at remote computing device 531 and transmit instructions to virtual machine receiver 522 of client computing device 501 to load the page content. However, in some instances, third party computing device 561 may be associated with one or more locational-based access restrictions which my prohibit client computing device 501 from accessing the page content of the URL. In such instances, virtual delivery agent 552 may instantiate, and provide content rendering instructions through, virtual proxy server(s) 556.

FIGS. 6A-6G depict an illustrative event sequence for redirecting web content from a virtual desktop to a client computing device in accordance with one or more illustrative aspects described herein. The events may be performed in the order depicted and described, or in any other arrangement and/or sequence.

Figure 6A:
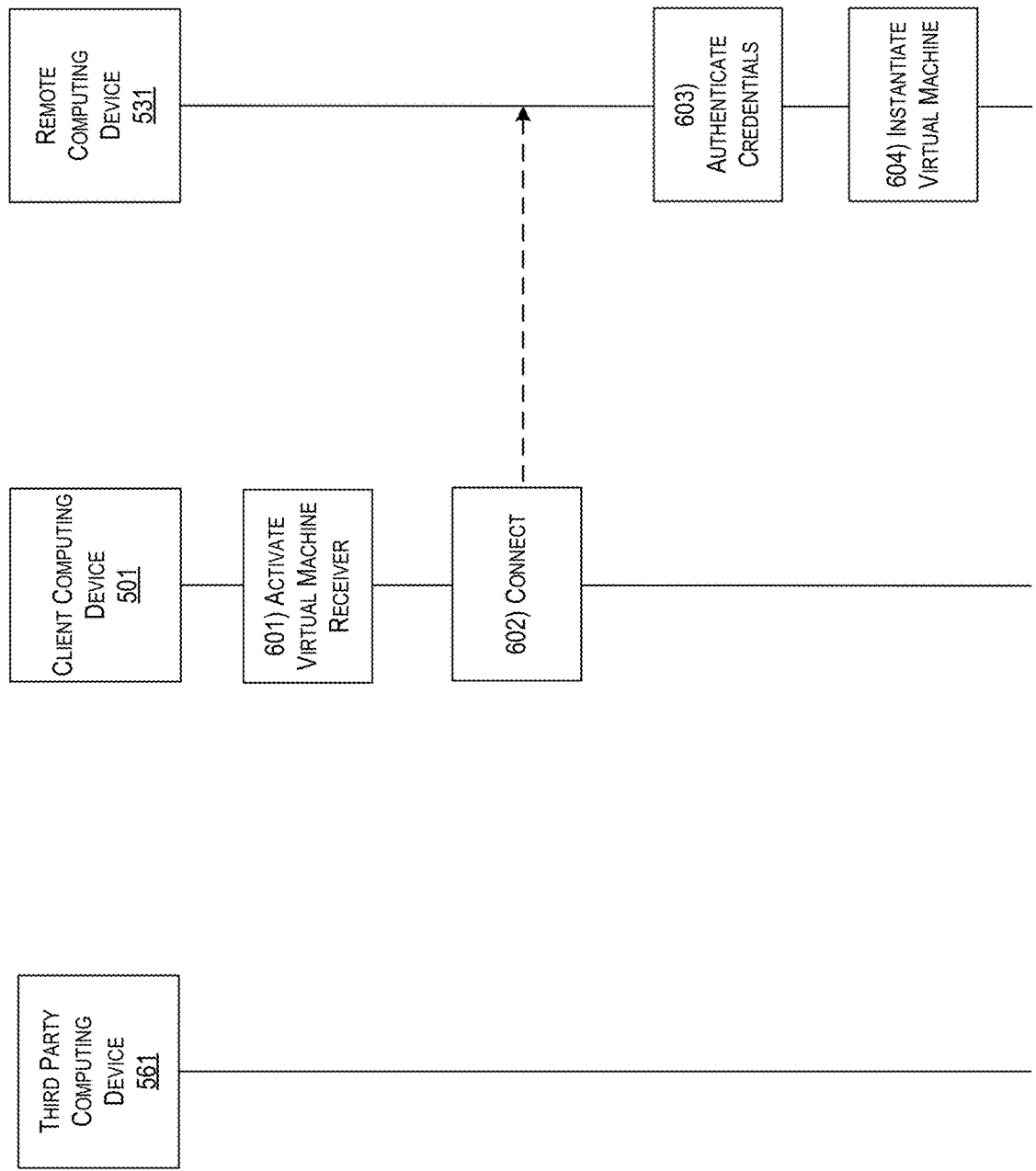

Referring to FIG. 6A, at step 601, a user of client computing device 501 may activate virtual machine receiver 522. In some instances, the activation may entail launching the application associated with virtual machine receiver 522. Alternatively, the activation may entail launching a web browser application and connecting to a URL associated with remote computing device 531.

At step 602, virtual machine receiver 522 of client computing device 501 may connect with remote computing device 531 across computer network 570. To form the connection, a user of the client computing device 501 may provide credentials such as a username and password to remote computing device 531 by way of virtual machine receiver 522. At step 603, remote computing device 531 may authenticate the credentials provided by the user of client computing device 501. To do so, remote computing device 531 may compare and corroborate the user provided credentials to previously stored credentials associated with the user stored in physical memory 546.

At step 604, remote computing device 531 may instantiate a virtual machine for the user of client computing device 501 and corresponding to virtual machine receiver 522 operating on client computing device 501. In some instances, the instantiation of the virtual machine may include generating virtual delivery agent 552, logically coupling virtual delivery agent 552 with at least virtual machine receiver 522, and creating a virtual channel over computer network 570 through which the virtual machine receiver 522 of client computing device 501 and virtual delivery agent 552 of remote computing device 531 may communicate. Alternatively, if a virtual machine associated with the user of client computing device 531 is already active, remote computing device 531 may connect the virtual machine receiver 522 of client computing device 501 to the virtual delivery agent 552 operating on remote computing device 531 corresponding to the active virtual machine session.

Figure 6B:
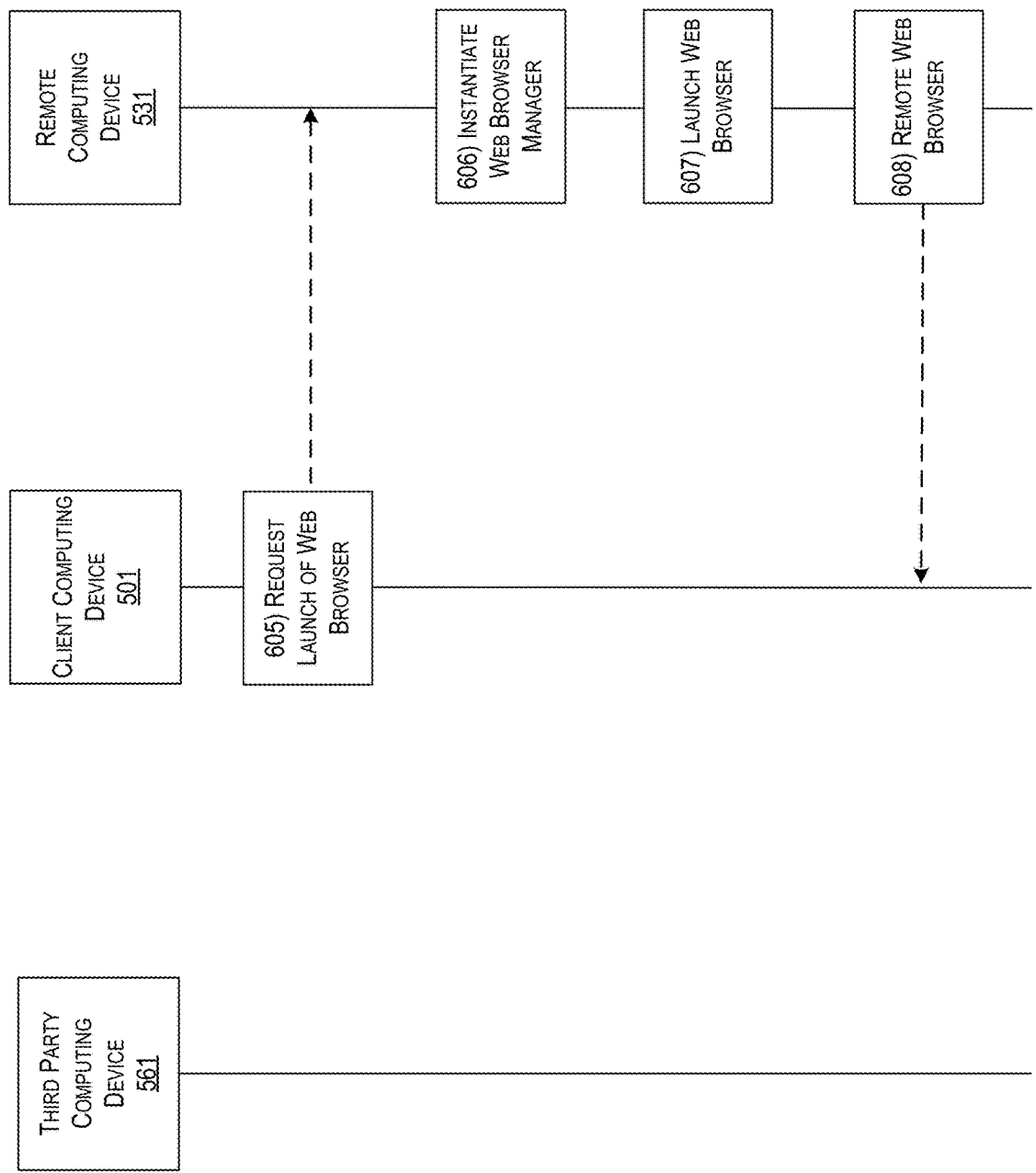

Referring to FIG. 6B, at step 605, the user of client computing device 501 may request the launch of a web browser instance through virtual machine receiver 522. Virtual machine receiver 522 may transmit the request across the virtual channel to virtual delivery agent 552 at remote computing device 531. At step 606, virtual delivery agent 552 of remote computing device 531 may instantiate web browser manager 554, which may control and monitor information associated with a web browser instance in a virtual machine session between client computing device 501 and remote computing device 531. For example, web browser manager 554 may monitor the web browser instance and transmit updates to virtual delivery agent 552 regarding the web browser instance including visibility, position, size, clipping or overlapping by other windows, and scaling and scrolling information.

At step 607, web browser manager 554 of remote computing device 531 may launch a web browser instance on a virtual machine associated with the user of client computing device 501 and virtual machine receiver 522. In doing so, web browser manager 554 may create a frame associated with the web browser instance and corresponding landing information for the web browser instance. Such landing information may correspond to a default browser home page, previously stored user selected home page, and the like. At step 608, virtual delivery agent 552 may remote the web browser instance through the virtual channel to virtual machine receiver 522 on client computing device 501.

Figure 6C:
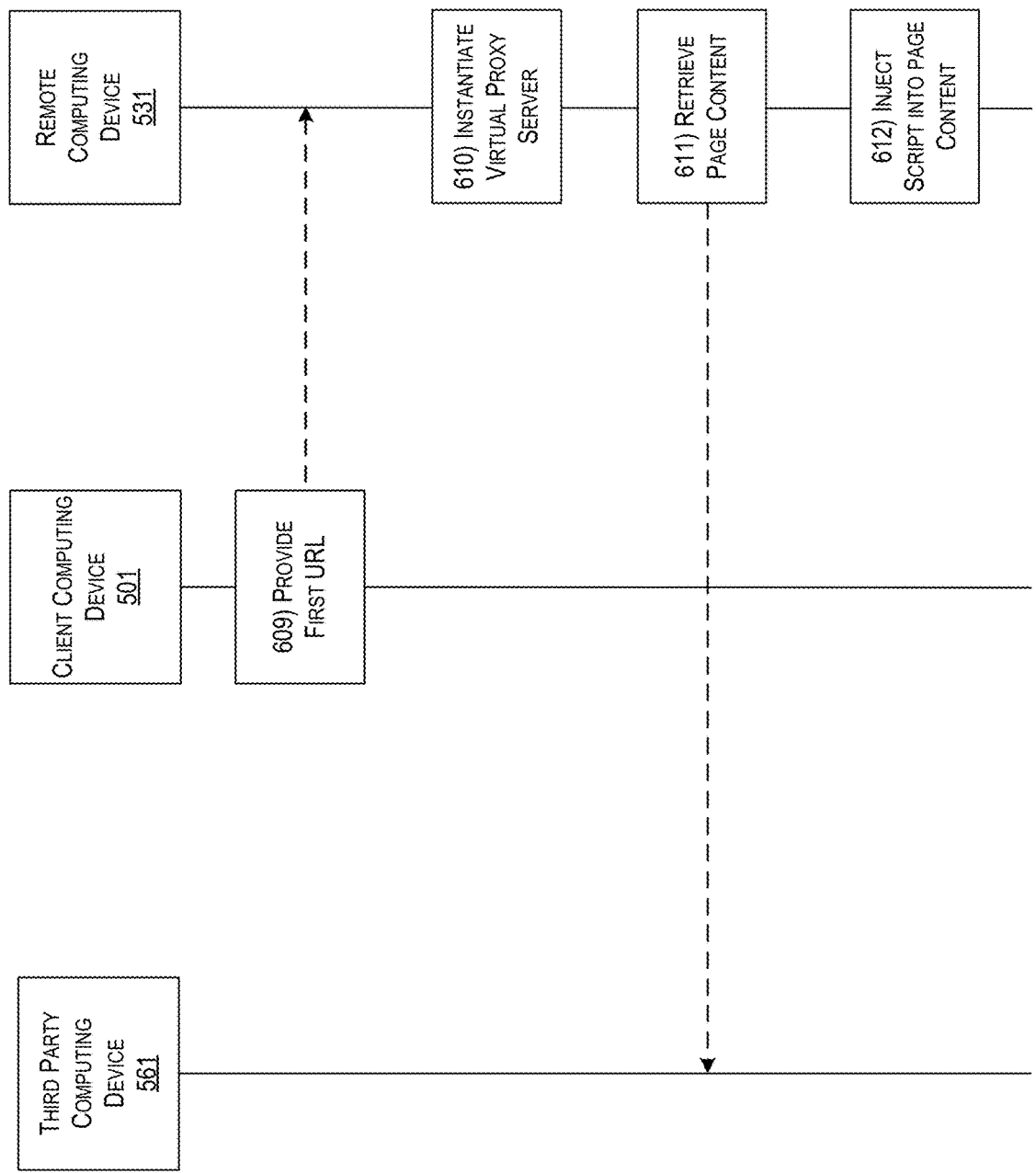

Referring to FIG. 6C, at step 609, the user of client computing device 501 may provide a first URL to the virtual machine session on remote computing device 531 through the remoted web browser instance on the virtual machine receiver 522. In some instances, the first URL may correspond to third party computing device 561. Alternatively, the first URL may be provided during a browsing event not related to a direct user provision. At step 610, virtual delivery agent 552 may instantiate a first virtual proxy server 556 at remote computing device 531. First virtual proxy server 556 may be associated with gateway 544 of remote computing device 531. However, in some arrangements, first virtual proxy server 556 may have been previously instantiated by virtual delivery agent 552. In such instances, step 610 may be omitted in the event sequence. Alternatively, first virtual proxy server 556 may be a first proxy server, which may be a dedicated hardware server configured to perform proxy services. As such, first proxy server may be a part of, and/or communicatively coupled with, remote computing device 531.

At step 611, virtual delivery agent 552 of remote computing device 531 may instruct first virtual proxy server 556 to retrieve page content data from third party computing device 561 corresponding to the first URL. At step 612, first proxy server 556 may inject one or more scripts into the page content retrieved from third party computing device 561. Such scripts may be in one or more programing languages including JavaScript.

While the discussion provided above in regard to steps 611 and 612 was made in relation to first virtual proxy server 556, one should understand that such steps may be at least equally performed by proxy server arrangements such as the first proxy server. As much holds for the discussion provided below.

Figure 6D:
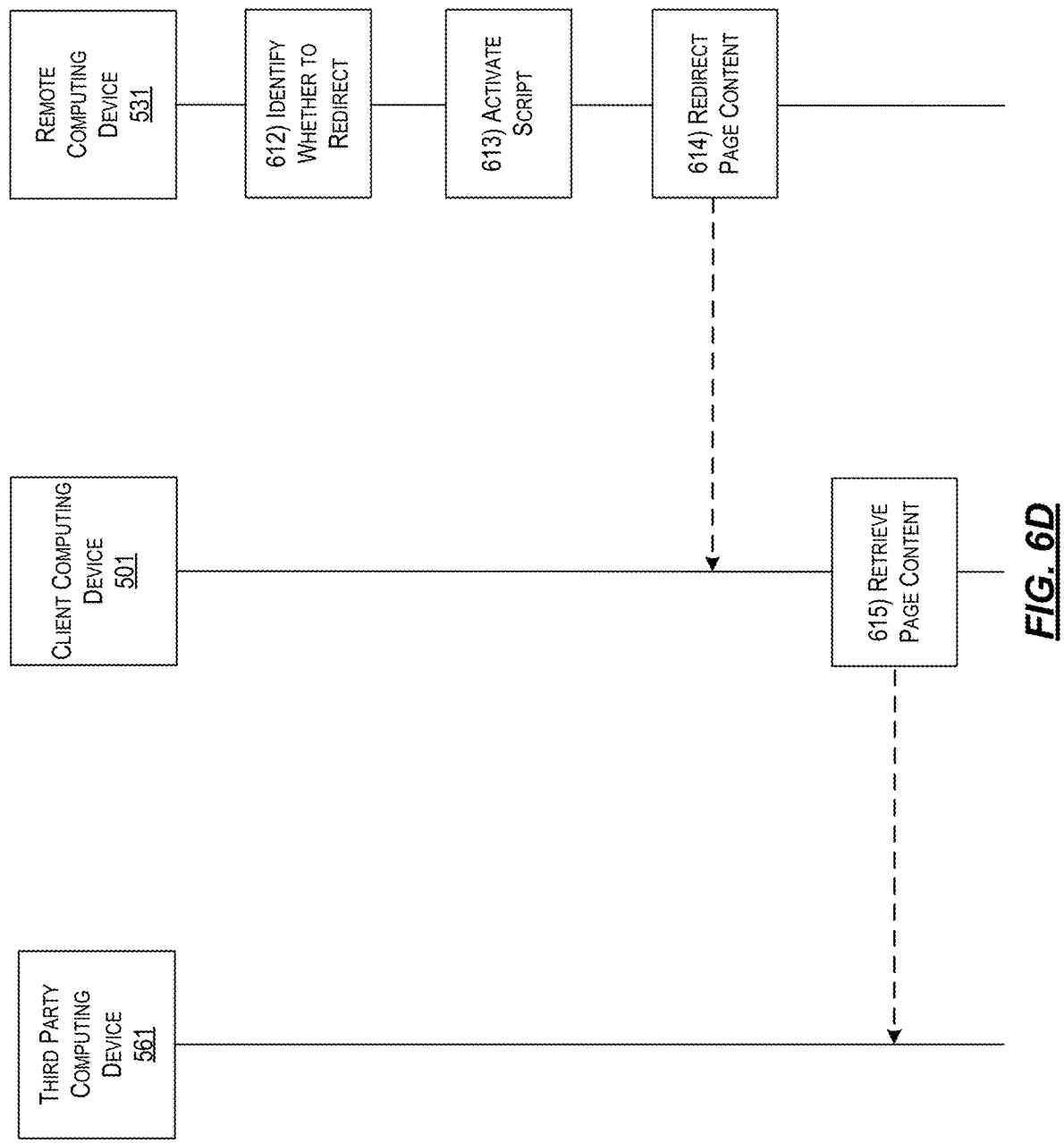

Referring to FIG. 6D, at step 612, virtual delivery agent 552 may identify whether or not to redirect the rendering and/or loading of the page content to client computing device 501, as opposed to letting the page content be rendered at remote computing device 531 through the virtual machine session. The identification may involve one or more of assessing the first URL associated with third party computing device 561, assessing the page content of the first URL, and receiving a user input to cause page content of the first URL to be rendered and/or loaded at client computing device 501.

For example, in regard to assessing the page content of the first URL associated with third party computing device 561, virtual delivery agent 552 may compare the first URL to previously stored in memory, which may be identified for rendering on remote computing device 531 or client computing device 501. In particular, URLs corresponding to page content including video (e.g., HTML5 video), media source extensions, encrypted media extensions, Flash video, transparent or alpha-blended overlays, and/or the like, which may be processing and bandwidth intensive to render at remote computing device 531 and transmit to client computing device 501, may be identified for rendering on client computing device 501. Conversely, URLs corresponding to page content without video (e.g., HTML5 video), media source extensions, encrypted media extensions, Flash video, transparent or alpha-blended overlays, and/or the like may be identified for rendering on remote computing device 531.

In regard to assessing the page content of the first URL associated with the third party computing device 561, virtual delivery agent 552 and/or first virtual proxy server 556 may parse the page content corresponding to the first URL of the third party computing platform 130 to identify at least one or more items of dynamic page content including video (e.g., HTML5 video), media source extensions, encrypted media extensions, Flash video, transparent or alpha-blended overlays, and the like. In the event that such content is identified through parsing, rendering may be identified for client computing device 501. Conversely, if such content is not identified through parsing the page content of the URL, then rendering may be identified for remote computing device 531.

In regard to receiving a user input to cause page content of the first URL to be rendered and/or loaded at client computing device 501, virtual delivery agent 552 may provide an actionable user interface button, by way of the virtual machine session and virtual channel, to virtual machine receiver 522 at client computing device 501. In some instances, the actionable user interface button may include a prompt to the user that, if a better browsing experience is desired, to engage with the actionable user interface button. If the actionable user interface button is clicked, pressed, and/or otherwise engaged with by the user of client computing device 501, then rendering and/or loading of page content associated with the first URL may be identified for client computing device 501.

At step 613, if it is identified that the page content is to be redirected to client computing device 501 for rendering and/or loading, virtual delivery agent 552 of remote computing device 531 may activate the one or more scripts injected into the page content by first virtual proxy server 556. The activated script, in turn, may cause page content of the first URL to cease loading in the web browser instance of the virtual computing session on remote computing device 531. In some instances, the frame of the web browser instance may remain in the virtual computing session.

Figure 9A:
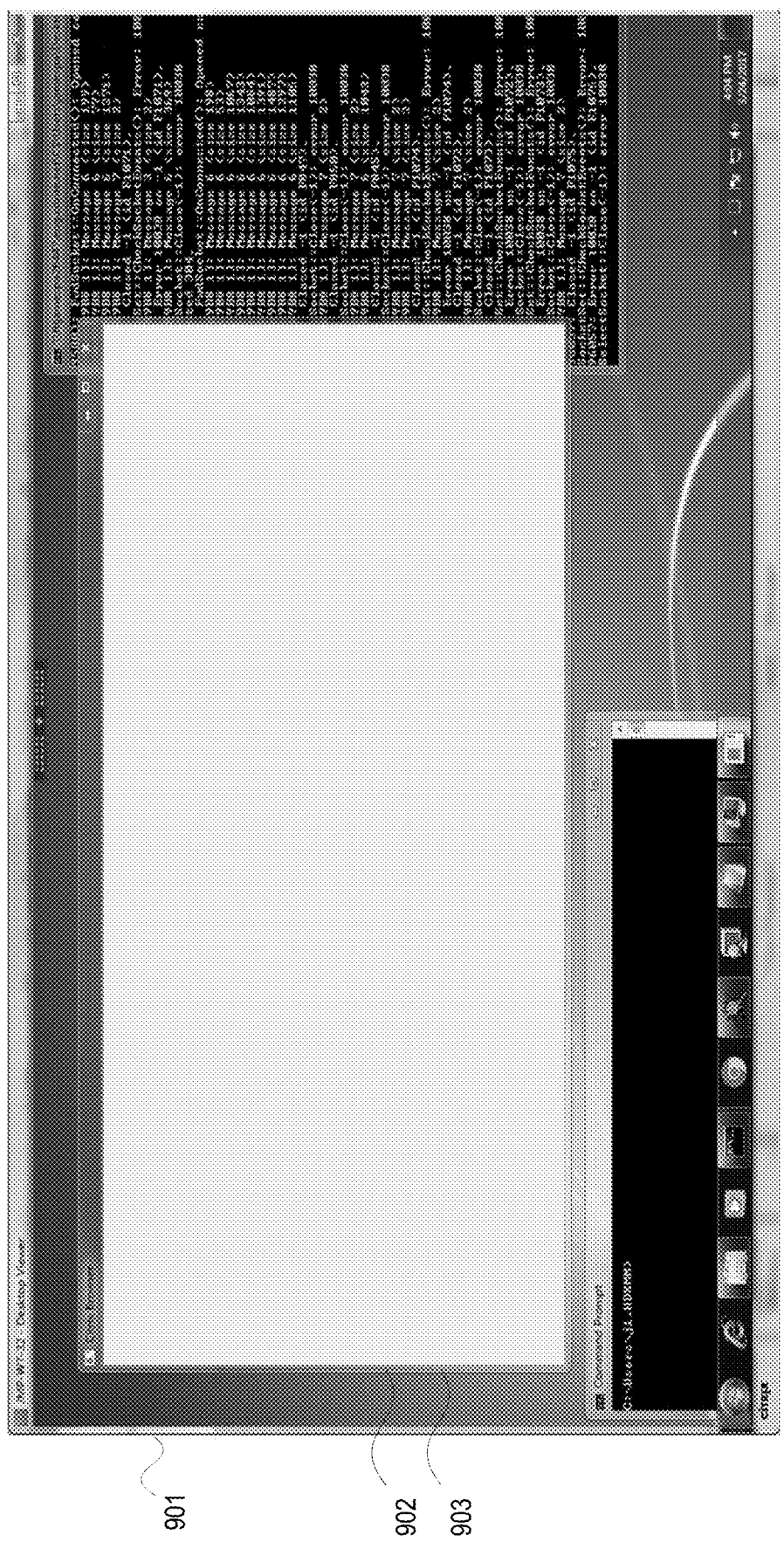
FIG. 9A depicts an illustrative depiction of server-side redirection of web content from a virtual desktop to a client computing device in accordance with one or more illustrative aspects described herein.

For example, in reference to FIG. 9A, which depicts an illustration of a server-side view (e.g., view of remote computing device 531) of virtual computing session 901 during the redirection of web content, web browser instance 902 of virtual session 901, after the activated script ceases rendering and/or loading of the URL, may provide a rendering of frame 903 of web browser instance 902 with no rendered and/or loaded web content. As will be described below, causing page content to cease rendering and/or loading in web browser instance 902 of virtual computing session 901 on remote computing device 531 may assist in providing a seamless user web browsing experience.

Alternatively, the activated script might not prevent the page content of the first URL to cease loading in the web browser instance of the virtual computing session on remote computing device 531, and instead may cause the page content to be hidden in the web browser instance in the virtual machine session and/or cease loading of items of dynamic page content such as video, media source extensions, encrypted media extensions, Flash video, transparent or alpha-blended overlays, and the like. In some instances, activation of the script might not be necessary and the causing of the page content to be hidden in the web browser instance in the virtual machine session and/or the ceasing loading of items of dynamic page content may be caused by virtual delivery agent 552 and/or web browser manager 554.

Referring back to FIG. 6D, at step 614, one or more of virtual delivery agent 552 and web browser manager 554 may redirect the rendering and/or loading of page content to client computing device 501 by transmitting instructions to virtual machine receiver 522 on client computing device 501 to cause the page content of the first URL corresponding to third party computing device 561 to be rendered and/or loaded by client computing device 501. The redirection may further include web browser cookies. In some instances, the instructions may include the information corresponding to the remoted web browser instance of the virtual machine including visibility, position, size, clipping or overlapping by other windows, and scaling and scrolling information. Such information may be utilized by client computing device 501 to render and/or load the page content corresponding to the first URL of the third party computing device 561 in an overlaid position on virtual machine receiver 522 corresponding to the remoted web browser instance. At step 615, based on the instructions received from remote computing device 531, client computing device 501 may retrieve page content data from third party computing device 561 corresponding to the first URL.

In some instances, however, client computing device 501 may not have permission to access the page content associated with the first URL. For example, page content of the first URL may be available in a local area network associated with third party computing device 561. In some instances, third party computing device 561 may be in a similar local area network as remote computing device 531. Virtual delivery agent 552 of remote computing device 531 may instantiate a second virtual proxy server to facilitate the redirection of page content. In particular, virtual delivery agent 552 may instantiate a second virtual proxy server 556 and transmit instructions to virtual machine receiver 522 to open a port with second virtual proxy server 556 and forward all URL requests through second virtual proxy server 556.

Figure 6E:
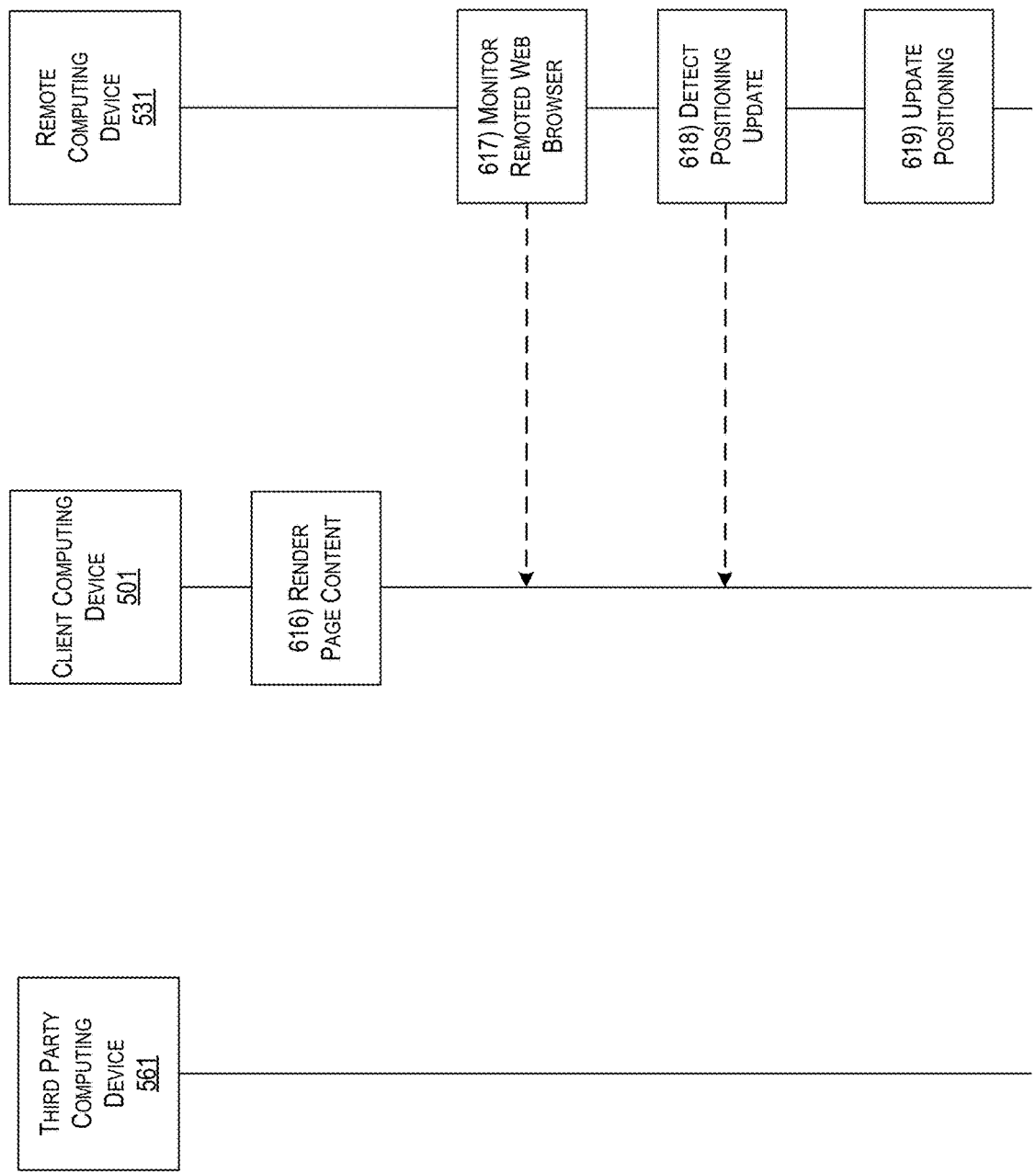

Referring to FIG. 6E, at step 616, client computing device 501 may render and/or load the retrieved page content in an overlaid position in relation to the frame of the remoted web browser produced by virtual browser manager 554 of remote computing device 531. In some instances, the rendering and/or loading of the page content by client computing device 501 may be based on the instructions received from remote device 531. As such, the page content may be rendered and/or loaded by client computing device 501 in an overlaid position in relation to the frame of the remoted web browser produced by virtual browser manager 554 of remote computing device 531.

Figure 9B:
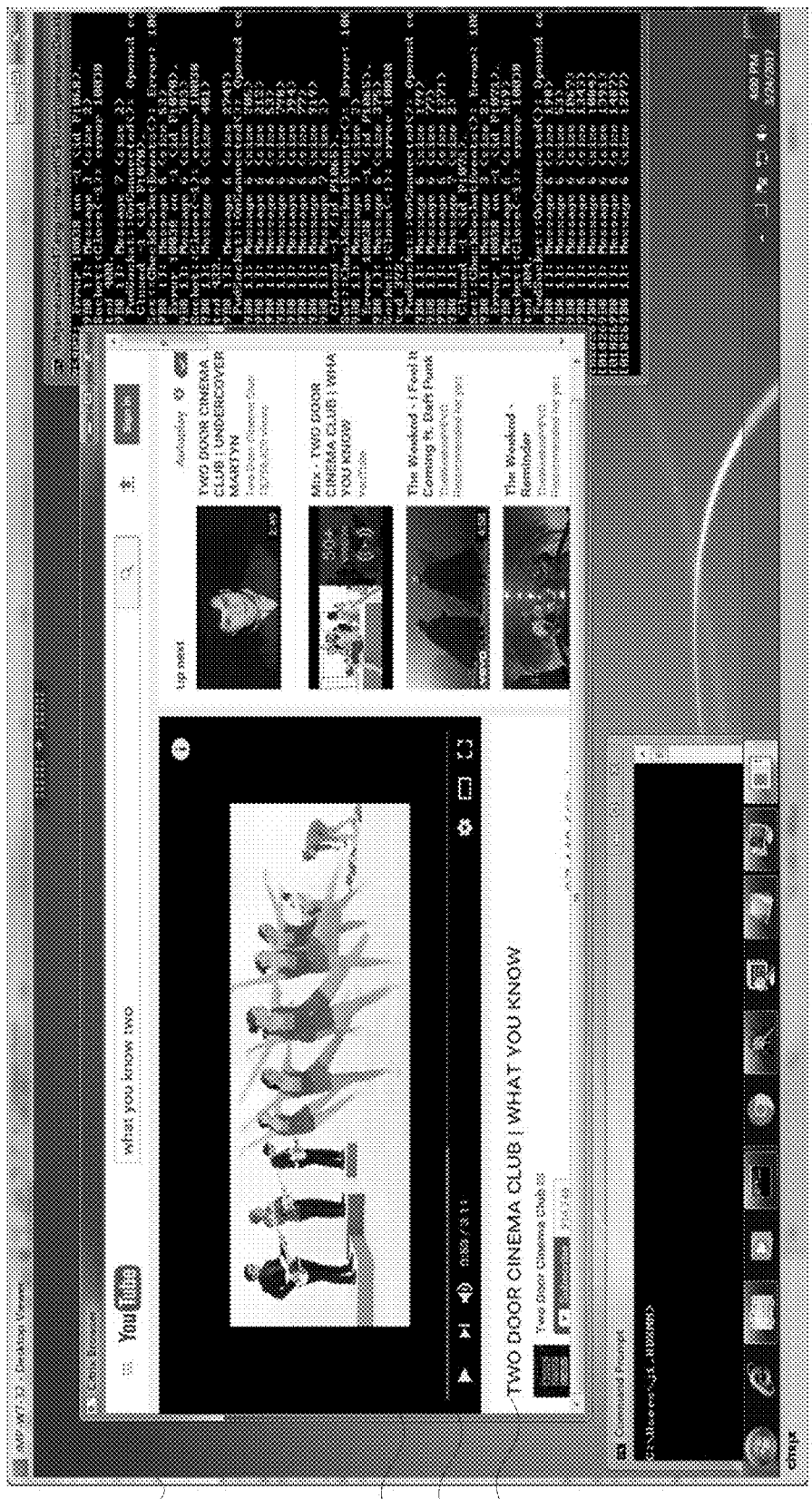
FIG. 9B depicts an illustrative depiction of client-side redirection of web content from a virtual desktop to a client computing device in accordance with one or more illustrative aspects described herein.

For example, in reference to FIG. 9B, which depicts which depicts an illustration of a client-side view (e.g., view of client computing device 501) of virtual computing session 901 during the redirection of web content, web browser instance 902 of virtual computing session 901 may provide a rendering of frame 903 which, as stated above, may be rendered at remote computing device 531 by virtual browser manager 554. Page content 904, however, may be rendered and/or loaded by client computing device 501 in an overlaid position in relation to frame 903 of remoted web browser instance 902 produced by virtual browser manager 554 of remote computing device 531.

By ceasing the rendering and/or loading of page content at remote computing device 531 and causing page content to be rendered and/or loaded at client computing device 501, network and processing bandwidth may be conserved. Further, in instances in which the rendering and/or loading of page content at remote computing device 531 is hidden and/or loading of items of dynamic page content is ceased, user benefits may be derived from improved user experience by creating a seamless browsing dynamic Referring back to FIG. 6E, at step 617, virtual browser manager 554 may monitor the remoted web browser for one or more of a page navigation event (e.g., pressing back button, pressing forward button, pressing refresh button, providing a second URL, and the like) and updates concerning visibility, position, size, clipping and/or overlapping by other windows, and scaling and scrolling information of the remoted web browser instance. The monitoring may be performed by way of virtual machine receiver 522 operating on client computing device 501. In some instances, the monitoring may involve the window frame of the remoted web browser on virtual machine receiver 522 at client computing device 501.

At step 618, virtual browser manager 554 may detect information corresponding to a positioning update regarding the remoted web browser instance on virtual machine receiver 522 at client computing device 501. In particular, the positioning update may involve one or more of updates concerning visibility, position, size, clipping and/or overlapping by other windows, and scaling and scrolling information of the remoted web browser instance. In some instances, the positioning update may be related to a movement of a position of the window frame of the remoted web browser. At step 619, virtual browser manager 554 may update the positioning of the remoted web browser instance on virtual machine receiver 522 at client computing device 501 based on the positioning update information.

Referring to FIG. 6F, at step 620, virtual browser manager 554 may transmit instructions to virtual machine receiver 522 on client computing device 501 to cause the page content of the first URL corresponding to third party computing device 561 to be rendered by client computing device 501 based on the updated positioning information. In some instances, the instructions may include the updated information corresponding to the remoted web browser instance of the virtual machine including visibility, position, size, clipping or overlapping by other windows, and scaling and scrolling information. Further, the information may be based on the movement of the position of the window frame of the web browser instance on virtual machine receiver 522 on client computing device 501. Such information may be utilized by client computing device 501 to render the page content corresponding to the URL of the third party computing device 561 in an overlaid position on virtual machine receiver 522 corresponding to the remoted web browser instance.

At step 621, virtual browser manager 554 may detect a browsing event at the remoted web browser on virtual machine receiver 522 at client computing device 501. In some instances, the browsing event may include at least one of pressing of the back button, pressing of the forward button, pressing of the refresh button, providing of a new URL, and the like. At step 622, virtual machine receiver 522 of client computing device 501 may provide a second URL through the virtual channel to virtual browser manager 554 of remote computing device 531.

At step 623, virtual browser manager 554 may update web browsing information at remote computing device 531 based on the second URL provided by the client computing device 501. The updating may include one or more of revising web browser history information, cookies, and other browsing data.

Figure 6G:
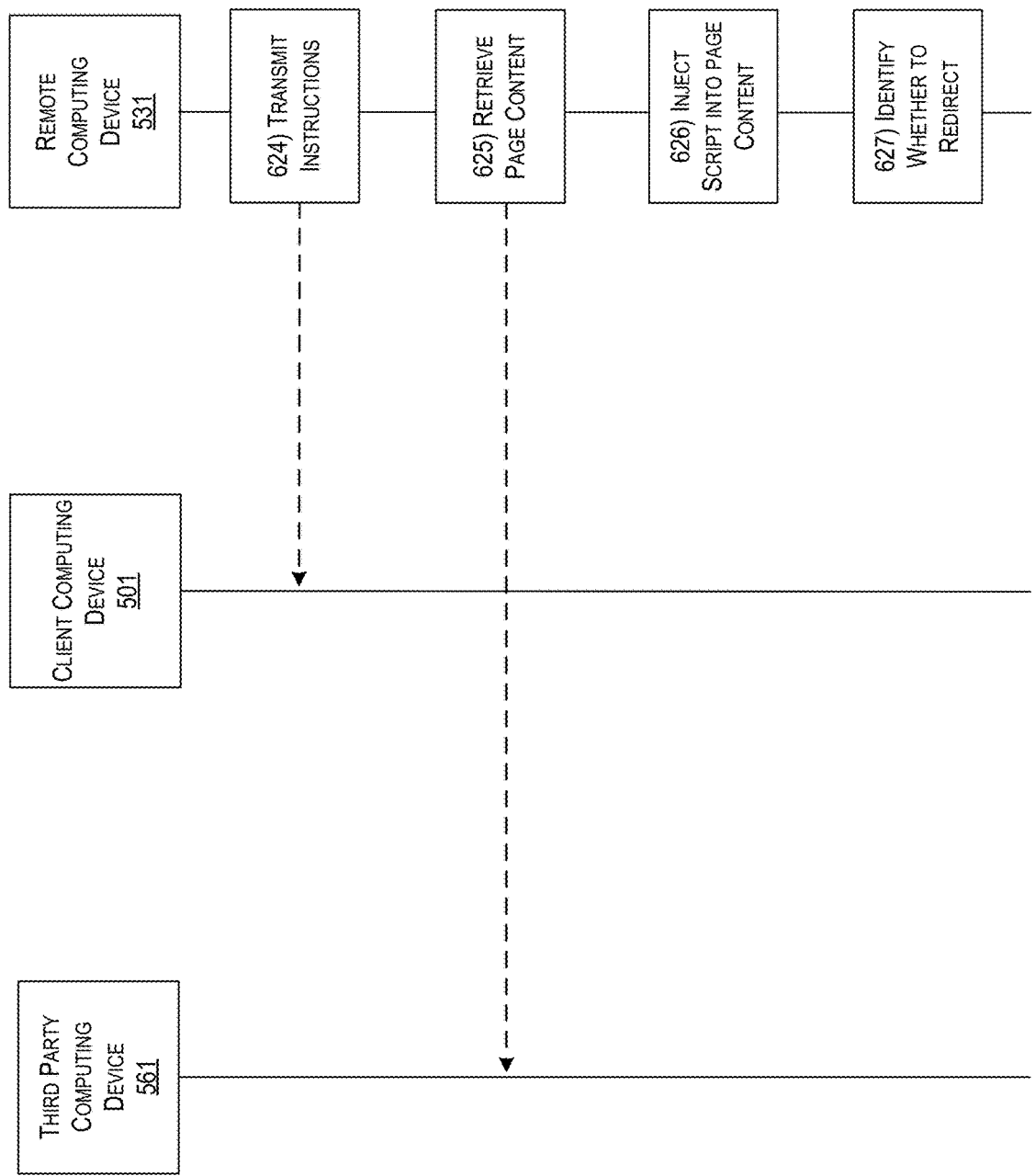

Referring to FIG. 6G, at step 624, virtual browser manager 554 may transmit instructions to virtual machine receiver 522 of client computing device 501 to cause client computing device 501 to cease rendering and/or loading page content associated with the second URL. In some instances, the instructions may cause client computing device to cease rendering and/or loading page content prior to commencing the rendering and/or loading of page content.

At step 625, virtual delivery agent 552 of remote computing device 531 may instruct first virtual proxy server 556 to retrieve page content data from third party computing device 561 corresponding to the second URL. In some instances, the page content data may be retrieved third party computing device 561. In other instances, however, the page content data may be retrieved from any computing device corresponding to the second URL. At step 626, first proxy server 556 may inject one or more scripts into the page content retrieved from third party computing device 561. Such scripts may be in one or more programing languages including JavaScript.

At step 627, virtual delivery agent 552 may identify whether or not to redirect the loading of the page content to client computing device 501, as opposed to letting the page content be rendered at remote computing device 531 through the virtual machine session. The identification may be similar to the process described above in regard to the first URL and may involve one or more of assessing the second URL and assessing the page content of the first URL.

In some instances, virtual delivery agent 552 may identify that the page content of the second URL is to be redirected to client computing device 501 for rendering and/or loading. In such instances, the event sequence may proceed similar to the manner described above in step 613 through step 616. Conversely, if virtual delivery agent 552 identifies that the page content of the second URL is not to be redirected to the client computing device 501 for rendering and/or loading, virtual delivery agent 552 may cause the page content to be rendered and/or loaded at remote computing device 531 and transmitted to virtual machine receiver 522 of client computing device 501 for presentation to the user of client computing device 501.

Figure 7:
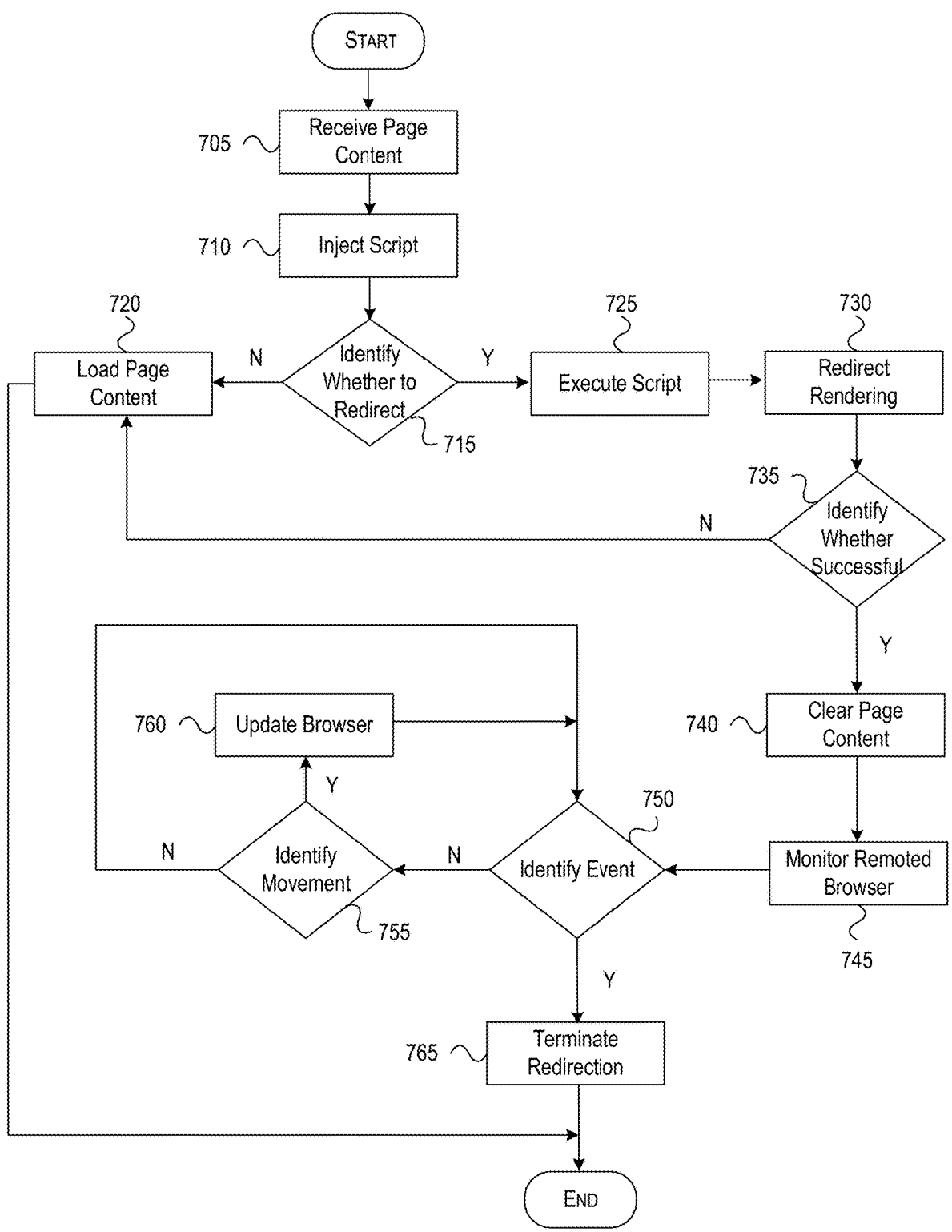
FIG. 7 depicts a first illustrative method for performing the redirection of web content from a virtual desktop to a client computing device in accordance with one or more illustrative aspects described herein.

FIG. 7 depicts a first illustrative method for performing the redirection of web content from a virtual desktop to a client computing device according to one or more illustrative aspects of the disclosure. Referring to FIG. 7, at step 705, virtual proxy server 556 of remote computing device 531 may receive page content from third party computing device 561. In some instances, the page content may correspond to a URL received from client computing device 501 by way of a remoted web browser instance through virtual machine receiver 522. As noted above, virtual machine receiver 522 of client computing device 501 may be connected through a virtual channel with remote computing device 531, which may be hosting a virtual machine session and the remoted web browser instance. At step 710, virtual proxy server 556 of remote computing device 531 may inject one or more scripts into the page content received at step 705.

At step 715, virtual delivery agent 552 of remote computing device 531 may identify whether or not to redirect page content corresponding to the URL for rendering and/or loading at client computing device 501. At step 720, if virtual delivery agent 552 identifies that the page content of the URL is not to be redirected to client computing device 501 for rendering and/or loading, then the page content may be loaded at remote computing device 531 and the method may end. However, if virtual delivery agent 552 identifies that the page content of the URL is to be redirected to client computing device 501 for rendering and/or loading, then at step 725, virtual delivery agent 552 may activate the one or more scripts injected into the page content by first virtual proxy server 556. The activated script, in turn, may cause page content of the URL to cease loading in the web browser instance of the virtual computing session on remote computing device 531.

At step 730, one or more of virtual delivery agent 552 and web browser manager 554 of remote computing device 531 may redirect the rendering and/or loading of page content to client computing device 501 by transmitting instructions to virtual machine receiver 522 on client computing device 501 to cause the page content of the URL corresponding to third party computing device 561 to be rendered and/or loaded by client computing device 501. At step 735, one or more of virtual delivery agent 552 and web browser manager 554 of remote computing device 531 may identify whether or not the redirection was successful. To do so, virtual delivery agent 552 and/or web browser manager 554 may query virtual machine receiver 522 to determine whether the page content is being rendered and/or loaded at client computing device 501. If the redirection is not successful and the page content is not being rendered and/or loaded at client computing device 501, then the method may return to step 720 and the page content may be rendered and/or loaded at remote computing device 531 and the method may end. If the redirection is successful and the page content is being rendered and/or loaded at client computing device 501, then the method may proceed to step 740 where one or more of virtual delivery agent 552 and web browser manager 554 of remote computing device 531 may clear the page content from remote computing device 531 and, in particular, the remoted web browser instance.

At step 745, virtual browser manager 554 may monitor the remoted web browser for one or more of a page navigation event (e.g., pressing back button, pressing forward button, pressing refresh button, providing a second URL, and the like) and updates concerning visibility, position, size, clipping and/or overlapping by other windows, and scaling and scrolling information of the remoted web browser instance. At step 750, virtual browser manager 554 of remote computing device 531 may identify whether a page navigation event occurred. If virtual browser manager 554 identifies that a web browsing event occurred, then at step 765, one or more of virtual browser manager 554 and virtual delivery agent 552 of remote computing device 531 may terminate the redirection of page content by transmitting instructions to virtual delivery agent 522 of client computing device 501 to cause client computing device 501 to cease rendering and/or loading page content and the method may end.

If virtual browser manager 554 identifies that a web browsing event did not occur, then at step 755, virtual browser manager 554 of remote computing device 531 may identify whether a movement of the remoted web browser instance occurred. If a movement of the remoted web browser instance did not occur, then the method may return to step 750. If a movement of the remoted web browser instance did occur, however, then the method may proceed to step 760 where virtual browser manager 554 may update the positioning of the remoted web browser instance on virtual machine receiver 522 at client computing device 501 based on positioning update information.

Figure 8:
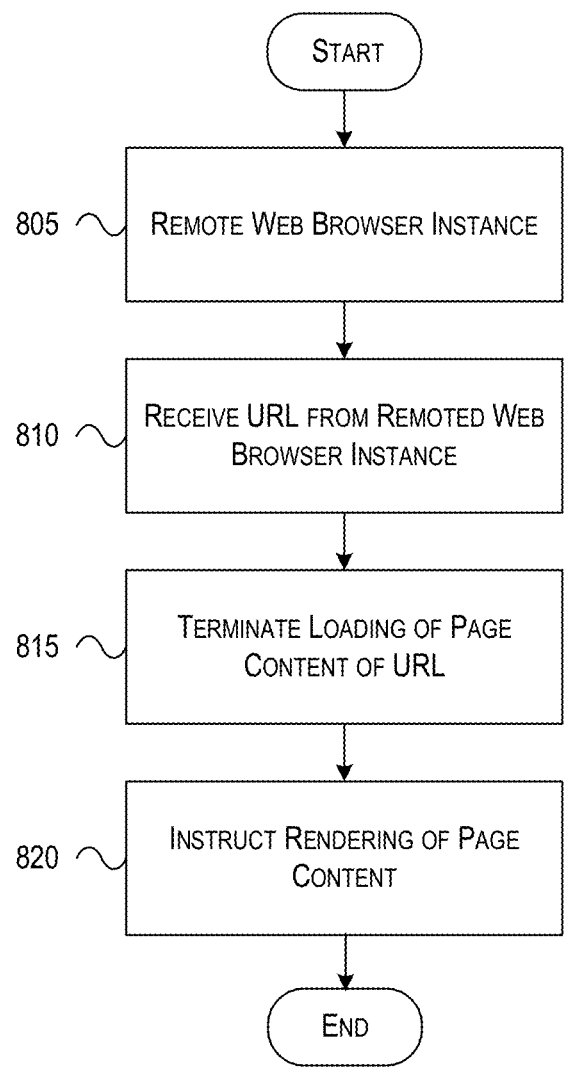
FIG. 8 depicts a second illustrative method for performing the redirection of web content from a virtual desktop to a client computing device in accordance with one or more illustrative aspects described herein.

FIG. 8 depicts a second illustrative method for performing the redirection of web content from a virtual desktop to a client computing device according to one or more illustrative aspects of the disclosure. Referring to FIG. 8, at step 805, a virtual delivery agent on a remote computing device may remote, through a virtual channel communicatively coupling the remote computing device to a client computing device, a web browser instance to a receiver of the client computing device. At step 810, the virtual delivery agent on the remote computing device may receive, from the remoted web browser instance on the client computing device, a URL. At step 815, based on the URL, the virtual delivery agent on the remote computing device, may terminate loading of page content associated with the URL on the remote computing device. At step 820, the virtual delivery agent on the remote computing device may instruct the client computing device to render the page content in an overlaid position corresponding to the remoted web browser instance on the receiver.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   remoting, by a computing device through a virtual channel, a web browser instance to a client device;
   receiving, at the computing device from the remoted web browser instance on the client device, a uniform resource locator (URL);
   based on the URL, terminating, by the computing device, loading of a page content associated with the URL on the computing device;
   generating, by the computing device, a window frame of the remoted web browser instance on the client device;
   monitoring, by the computing device, a position of a window frame of the remoted web browser instance on the client device;
   detecting, by the computing device, a movement of the window frame of the remoted web browser instance on the client device; and
   based on the movement of the window frame, instructing, by the computing device, the client device to render the page content as an overlay within the remoted web browser instance on the client device.

2. The method of claim 1, further comprising:
   redirecting, by the computing device, locational and clipping information for the window frame of the remoted web browser instance to the client device.

3. The method of claim 2, wherein the instructing, by the computing device, the client device to render the page content as the overlay within the remoted web browser instance on the client device is further based off the redirected locational and clipping information for the window frame of the remoted web browser instance.

4. The method of claim 1, wherein the generating of the window frame contains no enclosed content.

5. The method of claim 1, wherein the detecting, by the computing device, a movement of the window frame of the remoted web browser instance on the client device comprises one or more updates concerning visibility, scaling, and scrolling information of the remoted web browser instance.

6. The method of claim 1, further comprising:
   analyzing, by the computing device, the URL, and an associated page content.

7. The method of claim 1, further comprising:
   inserting, by the computing device, a functional script into the page content associated with the URL; and
   based on the URL, activating, by the computing device, the functional script to prevent the page content from loading on the computing device.

8. A method comprising:
   providing, by a computing device, a web browser to a client device, the web browser being accessible by the client device via a virtual machine session provided by the computing device;
   receiving, by the computing device, data from the web browser, the data being indicative of a web address for a webpage;
   determining, by the computing device, to render content associated with the webpage on the client device instead of through use of the virtual machine session; and
   providing, by the computing device, instructions to the client device to render the content associated with the webpage within a display of the client device and relative to content of the web browser, so as to transfer at least one processing task in generation of the webpage from the computing device to the client device.

9. The method of claim 8, further comprising:
   maintaining, by the computing device, a position of a window frame around the rendered content associated with the webpage on the client device when the rendered content is moved.

10. The method of claim 9, wherein the maintaining, by the computing device, a position of the window frame comprises one or more updates concerning visibility, scaling, and scrolling information of the remoted web browser instance.

11. The method of claim 9, further comprising:
    redirecting, by the computing device, locational and clipping information for the window frame.

12. The method of claim 11, wherein the maintaining, by the computing device, a position of the window frame around the rendered content associated with the webpage on the client device is further based off of the redirected locational and clipping information for the window frame.

13. The method of claim 9, wherein the maintaining of the window frame contains no enclosed content.

14. The method of claim 8, further comprising:
    analyzing, by the computing device, the data indicative of a web address for a webpage and an associated page content.

15. The method of claim 8, further comprising:
    inserting, by the computing device, a functional script into the content associated with the data indicative of a web address for a webpage; and
    based on the data indicative of a web address for a webpage, activating, by the computing device, the functional script to prevent the content associated with the webpage from loading on the computing device.

16. A server device, comprising:

a processor; and memory storing computer-readable instructions that, when executed by the processor, cause the server device to;

provide, by a computing device, a web browser to a client device, the web browser being accessible by the client device via a virtual machine session provided by the computing device;

receive, by the computing device, data from the web browser, the data being indicative of a web address for a webpage;

determine, by the computing device, to render content associated with the webpage on the client device instead of through use of the virtual machine session; and provide, by the computing device, instructions to the client device to render the content associated with the webpage within a display of the client device and relative to content of the web browser, so as to transfer at least one processing task in generation of the webpage from the computing device to the client device.

17. The server device of claim 16, further comprising computer-readable instructions that, when executed by the processor, cause the server device to:

detect, by the computing device, a movement of a window frame around the rendered content associated with the webpage on the client device; and maintain, by the computing device, a position of a window frame around the rendered content associated with the webpage on the client device when the rendered content is moved.

18. The server device of claim 17, further comprising computer-readable instructions that, when executed by the processor, cause the server device to:

redirect, by the computing device, locational and clipping information for the window frame.

19. The server device of claim 17, wherein the computer-readable instructions that, when executed by the processor, cause the server device to generate the window frame contains no enclosed content.

20. The server device of claim 16, further comprising computer-readable instructions that, when executed by the processor, cause the server device to:

analyze, by the computing device, the data indicative of a web address for a webpage and an associated page content.

* * * * *